United States Patent [19]

Hemler et al.

[11] 4,108,795

[45] Aug. 22, 1978

[54] METHOD OF REGENERATING COKE-CONTAMINATED CATALYST WITH SIMULTANEOUS COMBUSTION OF CARBON MONOXIDE

[75] Inventors: Charles L. Hemler, Mt. Prospect; Laurence O. Stine, Western Springs, both of Ill.

[73] Assignee: UOP Inc., Des Plaines, Ill.

[21] Appl. No.: 737,358

[22] Filed: Nov. 1, 1976

Related U.S. Application Data

[63] Continuation-in-part of Ser. No. 654,260, Feb. 2, 1976, abandoned.

[51] Int. Cl.² .................. B01J 21/20; B01J 29/38; C10G 11/04; C10G 11/18
[52] U.S. Cl. .................. 252/419; 252/417; 208/113; 208/120; 208/164
[58] Field of Search ............... 252/417, 419, 414, 412; 208/113, 120, 164; 75/0.05 A; 427/125

[56] References Cited

U.S. PATENT DOCUMENTS

| 2,589,124 | 3/1952 | Packie | 208/150 |
| 3,140,252 | 7/1964 | Frillette | 208/120 |
| 3,140,263 | 7/1964 | Payne | 252/412 |
| 3,140,264 | 7/1964 | Oleck et al. | 252/412 |
| 3,210,296 | 10/1965 | Gray | 252/466 PT |
| 3,440,107 | 4/1969 | Barber | 252/425.3 |
| 3,457,116 | 7/1969 | Arcano et al. | 252/425.3 |
| 3,696,025 | 10/1972 | Chessmore | 208/120 |
| 3,909,392 | 9/1975 | Horecky, Jr. et al. | 208/120 |
| 3,966,587 | 6/1976 | Bittensky et al. | 252/417 |
| 4,064,037 | 12/1977 | Graven et al. | 208/120 |
| 4,064,039 | 12/1977 | Penick | 208/120 |
| 4,072,600 | 2/1978 | Schwartz | 208/120 |

FOREIGN PATENT DOCUMENTS

| 2,444,911 | 4/1975 | Fed. Rep. of Germany | 252/455.2 |
| 2,327,209 | 12/1973 | Fed. Rep. of Germany | 252/417 |
| 46-25369 | 7/1971 | Japan | 252/460 |
| 1,146,530 | 3/1969 | United Kingdom | 75/0.5 A |

*Primary Examiner*—P. E. Konopka
*Attorney, Agent, or Firm*—James R. Hoatson, Jr.; Thomas K. McBride; William H. Page, II

[57] ABSTRACT

A method for regenerating a coke-contaminated cracking catalyst with the simultaneous carefully controlled combustion of CO to $CO_2$ within a regeneration zone to produce regenerated catalyst and flue gas. Novel features of the method include adding to the regeneration zone, independently of the cracking catalyst, a liquid comprising a soluble CO oxidation promoter selected from the group consisting of the noble metals and compounds thereof and combusting CO to $CO_2$ in the presence of the promoter and regenerated catalyst. The liquid may be added to the regeneration zone in amounts to control the CO concentration in the flue gas, a regeneration zone temperature, or the residual carbon concentration on regenerated catalyst.

34 Claims, No Drawings

METHOD OF REGENERATING COKE-CONTAMINATED CATALYST WITH SIMULTANEOUS COMBUSTION OF CARBON MONOXIDE

CROSS-REFERENCE TO RELATED APPLICATIONS

This application is a continuation-in-part application of our prior copending application Ser. No. 654,260 filed Feb. 2, 1976, now abandoned which application is incorporated herein by reference thereto.

BACKGROUND OF THE INVENTION

1. Field of the Invention

The field of art to which this invention pertains is hydrocarbon processing and more specifically to a fluid catalytic cracking process. More particularly the present invention is concerned with a method for regenerating a coke-contaminated cracking catalyst with the simultaneous carefully controlled combustion of CO to $CO_2$ within a regeneration zone of a catalyst cracking process.

2. Prior Art

Regeneration techniques in which a coke-contaminated catalyst is regenerated in a regeneration zone occupy a large segment of the chemical arts. Particularly common are regeneration techniques used to regenerate a coke-contaminated fluidizable catalytic cracking catalyst within the regeneration zone of a fluid catalytic cracking (FCC) process. Until recent years the prior art has been primarily concerned with removing the maximum amount of a coke from spent catalyst and at the same time preventing excessive temperature levels resulting from the conversion of carbon monoxide to carbon dioxide within certain portions of the regeneration zone, especially in the dilute-phase catalyst region where there is little catalyst present to absorb the heat of reaction and where heat damage to cyclones or other separation equipment can therefore result. Essentially complete CO conversion in conventional regeneration zones were prevented quite simply by limiting the amount of fresh regeneration gas passing into the regeneration zone. Without sufficient oxygen present to support the oxidation of CO to $CO_2$, afterburning simply cannot occur no matter what the temperatures in the regeneration zone. As well, temperatures in the regeneration zone were generally limited to less than about 1250° F. by selecting hydrocarbon-reaction-zone operating conditions or fresh feed streams or recycle streams or combinations thereof to limit the amount of coke on spent catalyst and hence the amount of fuel burned in the regeneration zone. The flue gas produced, containing several volume percent CO, was either vented directly to the atmosphere or used as fuel in a CO boiler located downstream of the regeneration zone. Usual FCC startup practice, familiar to those skilled in the art of FCC processes, was to initially manually regulate the flow of fresh regeneration gas to the regeneration zone in an amount insufficient to sustain essentially complete CO conversion while at the same time limiting regeneration zone temperatures to a maximum of about 1250° F. When reasonably steady-state control of the FCC process was achieved the flow rate of fresh regeneration gas was then typically regulated by instrument control directly responsive to a small temperature differential between a flue-gas-outlet temperature (or a dilute-phase-disengaging-space temperature) and a dense-bed temperature to maintain automatically this proper flow rate of fresh regeneration gas to preclude essentially complete conversion of CO to $CO_2$ anywhere within the regeneration zone. As the temperature difference increased beyond some predetermined temperature difference, indicating that more conversion of CO was taking place in the dilute phase, the amount of fresh regeneration gas was decreased to preclude essentially complete conversion of CO to $CO_2$. This method of control is exemplified by Pohlenz U.S. Pat. Nos. 3,161,583 and 3,206,393. While such method produces a small amount of $O_2$ in the flue gas, generally in the range of 0.1 to 1 vol. % $O_2$, it precludes essentially complete conversion of CO to $CO_2$ within the regeneration zone.

Until the advent of zeolite-containing catalysts, there was little economic incentive for essentially complete conversion of CO to $CO_2$ within the regeneration zone. The use of the zeolite-containing FCC catalysts, which are more stable thermally and which have lower coke-producing tendencies than the older amorphous FCC catalysts, and the use of higher hydrocarbon conversion zone temperatures, however, often made additional heat input into the FCC process desirable. Typically additional heat was provided by burning external fuel such as torch oil in the regeneration zone or by adding or increasing the amount of feed preheat in external feed preheaters. Thus heat was typically being added to and then later removed from the FCC process by two external installations, a feed preheater and a CO boiler, each representing a substantial capital investment. Catalyst regeneration processes described in the recent prior art have recognized the advantages of essentially completely converting CO to $CO_2$ and recovering at least a portion of the heat of combustion of CO both within the regeneration zone. Examples of such regeneration processes are Stine et al. U.S. Pat. No. 3,844,973 and Horecky, Jr. et al. U.S. Pat. No. 3,909,392. The advantages of such processes are now well known; such regeneration processes permit the reduction or elimination of feed preheat, the elimination of CO air pollution without the need for external CO boilers, and, when coupled with hydrocarbon-reaction zones of modern design, improved yields of more valuable products.

Regeneration processes employing CO conversion promotors or catalysts are not novel; indeed prior art processes for regenerating fluidizable coke-contaminated cracking catalysts have employed such promoters or catalysts. For example, in the fluid catalytic cracking process described in Kassel U.S. Pat. No. 2,436,927, which issued in 1948, a physical mixture of discrete particles of a cracking catalyst and discrete particles of a supported CO oxidizing catalyst is employed in a dense-phase region of a regeneration zone to enhance CO conversion in the dense phase thus preventing "afterburning" in the dilute-phase region of the regeneration zone. In the process described in Chen U.S. Pat. No. 3,364,136, which issued in 1968, a mixture of a cracking catalyst and a shape-selective crystalline aluminosilicate containing an oxidation catalyst within its internal pore structure is used to control the $CO_2$ to CO ratio in the regeneration zone without influencing the reaction taking place in the hydrocarbon reaction zone. In the process described in Wilson U.S. Pat. No. 3,808,121 two separate catalysts of different particle size and composition are employed; a cracking catalyst and a CO oxidation catalyst preferably supported in a matrix material such as alumina spheres and monoliths. Moreover, the supported CO oxidation catalyst is confined within the regeneration zone and does not pass out of that zone to the hydrocarbon reaction zone as does the cracking catalyst. Coke and CO are oxidizing in the regeneration zone to minimize CO in the flue gas.

Thus the prior art regeneration processes have employed CO oxidation promoters in one of two ways: (1) on discrete particles of a matrix or a support, particles to be mixed with the fluid cracking catalyst, and (2) as an integral component of the fluid cracking catalyst itself. Disadvantages of a supported CO oxidation promoter are: the promoter has to be added to the support material outside of the regeneration zone; and, the additional cost of adding it to the support material plus the cost of the support material itself. A disadvantage of a cracking catalyst containing some predetermined concentration of a CO oxidation promoter as a component of the catalyst is the difficulty in achieving in any particular regeneration zone the optimum concentration of oxidation promoter suitable for the operating characteristics of that particular regeneration zone or required to achieve a particular change in a dependent process variable.

Our invention in one embodiment is a method for regenerating a coke-contaminated catalyst with the simultaneous carefully-controlled combustion of CO to $CO_2$ within a regeneration zone to produce regenerated catalyst and flue gas. By the method of our invention a liquid containing a CO oxidation promoter is added to the regeneration zone independently of the cracking catalyst, coke from spent catalyst is oxidized to produce regenerated catalyst and, essentially simultaneously, CO is converted to $CO_2$ in the presence of the promoter and regenerated catalyst within the regeneration zone. A liquid containing a soluble carbon monoxide oxidation promoter can be easily and precisely added to a regeneration zone in amounts to control a CO concentration in the flue gas or to control a temperature within the regeneration zone or to control an amount of residual carbon on regenerated catalyst. Addition of a liquid CO oxidation promoter by the method of our invention is therefore more economical than either employing separate particles of supported CO oxidation promoter along with a cracking catalyst or employing a cracking catalyst to which has been added a CO conversion promoter during the catalyst manufacturing procedure. Additionally the methd of our invention gives to the refiner as an operating variable what heretofore had been essentially a fixed operating condition. Thus with the method of our invention the refiner has increased operating flexibility. Our method is applicable to any fluid catalytic cracking process, existing or new.

SUMMARY OF THE INVENTION

It is accordingly, a broad objective of our invention to provide a method for regenerating a coke-contaminated catalyst with simultaneous carefully-controlled combustion of CO in a regeneration zone and in a manner to make a controlled quantity of exothermic heat of reaction available for operation of the regeneration zone and to decrease the amount of CO in the flue gas. Another objective of our invention is to provide, in a catalytic cracking process wherein coke-contaminated cracking catalyst and oxygen-containing regeneration gas are passed to a regeneration zone maintained at coke oxidizing conditions to produce a regenerated catalyst and a flue gas containing CO and $CO_2$, a method of using the in situ combustion of CO to $CO_2$ to control the operation of the regeneration zone. Other objectives of our invention are to provide, in a catalytic cracking process wherein coke-contaminated cracking catalyst and oxygen-containing regeneration gas are passed to a regeneration zone maintained at coke oxidation conditions to produce a regenerated catalyst and a flue gas containing CO and $CO_2$, (1) a method of controlling a CO concentration in the flue gas within a predetermined CO concentration range; (2) a method of controlling a regeneration zone temperature within a predetermined temperature range and, (3) a method of controlling a concentration of residual carbon on regenerated catalyst within a predetermined residual carbon concentration range.

In brief summary our invention is, in one embodiment, a method for regenerating a coke-contaminated catalyst with simultaneous carefully-controlled combustion of CO which comprises the steps of: (a) introducing coke-contaminated catalyst into a regeneration zone; (b) passing into said regeneration zone, independently of coke-contaminated catalyst and in an amount to promote the combustion of CO to $CO_2$, a solution comprising: (i) a CO oxidation promoter selected from the group consisting of the noble metals and compounds thereof; and (ii) a solvent; (c) passing an oxygen-containing regeneration gas into the regeneration zone in an amount selected to burn coke from said coke-contaminated catalyst and to provide sufficient excess oxygen to accomplish the desired amount of CO combustion; (d) reacting a first portion of the oxygen-containing regeneration gas with the coke-contaminated catalyst in the regeneration zone at oxidation conditions selected to remove coke from the coke-contaminated catalyst, to produce a flue gas containing CO and sufficient to cause combustion of CO to $CO_2$ in the presence of said oxidation promoter thereby producing regenerated catalyst and flue gas; and, (e) simultaneously contacting the flue gas and a second portion of the oxygen-containing regeneration gas with the CO oxidation promoter in the regeneration zone in the presence of regenerated catalyst at said oxidation condition, thereby (i) making a controlled quantity of exothermic heat of reaction available for operation of said regeneration zone and (ii) decreasing the amount of CO in flue gas.

In brief summary our invention is, in another embodiment, in a process for regenerating a coke-contaminated catalyst wherein coke-contaminated cracking catalyst and an oxygen-containing regeneration gas are passed to a regeneration zone maintained at coke oxidizing conditions wherein coke is oxidized to produce a regenerated catalyst and a flue gas containing CO and $CO_2$, a method of using the in situ combustion of CO to $CO_2$ to control the operation of the regeneration zone which comprises the steps of: (a) passing into said regeneration zone, independently of the coke-contaminated catalyst and in an amount selected to initiate and sustain CO combustion in said zone in the presence of said regenerated catalyst, a solution comprising: (i) a CO oxidation promoter selected from the group consisting of the noble metals and compounds thereof; and (ii) a solvent; and, (b) thereafter adjusting the amount of oxygen-containing regeneration gas being passed to said zone to a value stoichiometrically sufficient to burn the coke from the catalyst and to convert at least a portion of the CO to $CO_2$, thereby (i) making a controlled quantity of exothermic heat of reaction available for operation of said regeneration zone and (ii) decreasing the amount of CO in the flue gas.

Other objects and embodiments of the present invention encompass details about CO conversion promoters, amounts of a CO conversion promoter to be added, methods of adding a CO conversion promoter to the regeneration zone, and operating conditions all of which are hereinafter disclosed in the following discussion of each of these facets of our invention.

DESCRIPTION OF THE INVENTION

At the outset, the definition of various terms used herein will be helpful to an understanding of the method of our invention.

The term "hydrocarbon reaction zone" as used herein is that portion of FCC unit in which a hydrocarbon feed stream is contacted with regenerated catalyst at cracking conditions to produce a mixture of FCC product components, coke-contaminated (or spent) catalyst, and perhaps unreacted feed. Typical FCC product components after separation in equipment downstream of the hydrocarbon reaction zone are: $C_2$-fuel gas, $C_3$ and $C_4$ fractions, a gasoline fraction, light cycle oil, and clarified slurry oil. After separation from product components at least a portion of spent catalyst is directed to the regeneration zone. The terms "coke-contaminated catalyst" or "spent catalyst" are used interchangeably and mean catalyst withdrawn from a hydrocarbon conversion zone because of reduced activity caused by coke deposits. Spent catalyst passing into the regeneration zone can contain anywhere from a few tenths up to about 5 wt. % of coke, but typically in FCC operations spent catalyst will contain from about 0.5 to about 1.5 wt. % coke.

The term "regeneration zone" means that portion of the FCC unit into which an oxygen-containing regeneration gas and at least a portion of spent catalyst are passed in which at least a portion of coke is removed from spent catalyst by oxidation to produce regenerated catalyst and a flue gas containing $CO_2$ and CO. "Regenerated catalyst" means catalyst from which at least a portion of coke has been removed by oxidation. Regenerated catalyst produced when our method is employed will generally contain less than about 0.3 wt. % coke and more typically will contain from about 0.01 to about 0.15 wt. % coke. The term "regeneration gas" as used in this specification shall mean, in a generic sense, any gas which is to contact catalyst or which has contacted catalyst within the regeneration zone. Specifically, the term "oxygen-containing regeneration gas" shall mean a regeneration gas containing free or uncombined oxygen, such as air or oxygen enriched or deficient air, which passes into the regeneration zone to allow oxidation of coke from the spent catalyst and conversion of CO. The term "flue gas" shall mean regeneration gas which has contacted catalyst within the regeneration zone and which passes out of the regeneration zone. Flue gas will contain nitrogen, free-oxygen, carbon monoxide, carbon dioxide and water. Because CO and $CO_2$ concentrations are used in making routine FCC process calculations and since CO is a potential fuel which can be burned within the regeneration zone or an external CO boiler or perhaps both and additonally because air pollution emission limitations may exist for CO, the flue gas is typically characterized by the concentrations of CO and $CO_2$ or by the mole ratio of $CO_2/CO$. Depending upon the operating conditions employed within the regeneration zone, particularly the amount of oxygen-containing regeneration gas passed into the regeneration zone, the concentrations of CO in this gas can vary over a wide range of from a few hundred parts per million or less up to about 15 vol. % or more and the concentration of $CO_2$ can vary from about 5 vol. % to about 20 vol. %. When the regeneration zone is operated at conditions to essentially preclude controlled oxidation of CO within the regeneration zone the concentrations of CO and $CO_2$ will be approximately equal, each within the range of from about 7 to about 15 vol. %, and the $CO_2/CO$ mole ratio will be in the range of from about 0.8 to about 1.5. When the regeneration zone is operated at conditions to achieve partially complete oxidation of CO, the concentration of CO will be lower than that of $CO_2$ and more specifically the $CO_2/CO$ mole ratio will typically be from about 1.5 to about 100. When the regeneration zone is operated at conditions to achieve essentially complete combustion of CO within the regeneration zone the CO concentrations will typically be less than about 1000 ppm. and preferably less than 500 ppm. and the $CO_2/CO$ mole ratio will be greater than about 100.

The terms "dense-phase" and "dilute-phase" are commonly-used terms in the art of FCC to generally characterize catalyst densities in various parts of the regeneration zone or the hydrocarbon-reaction zone. While the demarkation density is somewhat ill-defined, as the term "dense-phase" is used herein it shall refer to regions within the regeneration zone where the catalyst density is greater than about 5 lb/ft$^3$ and as "dilute-phase" is used herein it refers to regions where the catalyst density is less than about 5 lb/ft$^3$. Usually the dense-phase density will be in the range of from about 5 to 35 lb/ft$^3$ or more and the dilute-phase density will be much less than 5 lb/ft$^3$ and in the range of from about 0.1 to about 5 lb/ft$^3$. Catalyst densities within regeneration zones are commonly measured by measuring pressure or head differences across pressure taps installed in the vessels and spaced at known distances apart.

The term "afterburning" as generally understood by those skilled in the art means the unintentional, uncontrolled oxidation of CO to $CO_2$ in the dilute-phase region of the regeneration zone or the flue gas line, where there is little catalyst available to act as a heat sink. Since the heat of reaction of CO oxidation is very exothermic (about 4350 BTU/lb. CO oxidized), afterburning can therefore result in severe damage to catalyst separation devices located in the dilute-phase. Generally afterburning is characterized by a rapid temperature increase and occurs during periods of unsteady state operations or process "upset". It is, therefore, usually of short duration until steady state operations are resumed.

In contrast to afterburning, the term "controlled conversion of CO" or "controlled oxidation of CO" shall refer to the intentional, controlled and sustained oxidation of CO in the presence of sufficient catalyst to absorb at least a portion of the heat of reaction thereby recovering at least a portion of the heat of reaction and precluding damage to regeneration zone equipment. Depending upon the operating conditions employed, the controlled oxidation of CO can be partially complete or essentially complete. "Partially complete" shall mean that the CO concentration in the flue gas has been reduced such that the $CO_2/CO$ mole ratio of the gas is in the range of from about 1.5 to 100. "Essentially complete" conversion of CO shall mean that the CO concentration of the gas has been reduced such that the $CO_2/CO$ mole ratio is greater than about 100. Typically essentially complete CO conversion will produce CO concentrations less than about 1000 ppm. and more preferably less than about 500 ppm.

The terms "CO conversion promoter" or "CO oxidation promoter" or simply "promoter" shall mean a substance which catalyzes the oxidation of CO to $CO_2$. With a CO conversion promoter the kinetic rate constant for the oxidation of CO to $CO_2$ may be increased typically from 2 to 5 times or even much more. Thus a faster rate of CO conversion can be obtained at conversion conditions in the presence of a CO conversion promoter than can be obtained at the same conversion conditions without the promoter. Conversely the same rate of CO conversion can be obtained at conversion conditions (such as temperature) which are less severe than those required without the CO conversion promoter.

The amount of CO oxidation promoter added to a regeneration zone, whether added as a solid or in a liquid, may be expressed in many ways. It may be expressed as that required to produce some desired change in a variable or it may be expressed in terms of circulating catalyst inventory or in terms of catalyst circulation rate or in terms of fresh cracking catalyst makeup rate or perhaps in terms of a barrel of feedstock. In this specification an amount of promoter is typically expressed as that amount required to produce a desired change in a variable such as temperature, CO concentration or residual carbon concentration but it is also expressed as wt. ppm. of circulating catalyst inventory. The term "circulating catalyst inventory" means that amount of cracking catalyst in the FCC process which can be circulated from the regeneration zone to the hydrocarbon reaction zone and back again. It differs from the total cracking catalyst inventory in the FCC unit because there is usually some portion of the total inventory that is unavailable for circulation, such as that portion of the total inventory typically located in the cone section of the regeneration zone under the pipe grid.

With these terms now in mind, brief reference to typical present-day FCC operations with particular emphasis on the regeneration zone operation will aid in understanding our invention in its various embodiments and the advantages of these embodiments. Present-day FCC operations have achieved a significant reduction in coke yield by the wide-spread use of crystalline aluminosilicate cracking catalysts and by the use of short hydrocarbon-catalyst contact times as exemplified by riser cracking. While this achievement has resulted in higher yields of more valuable gaseous and liquid products, it obviously decreased the amount of solid fuel available to be burned in the regeneration zone to supply the process heat balance requirements. Recent prior art processes recognized that by burning CO, produced by the oxidation of coke, within the regeneration zone and by recovering at least a portion of the exothermic heat of reaction, a sufficient amount of heat was now available for the heat balance requirements imposed by a wide range of operating conditions and feedstocks. Such CO burning also made possible further reductions in coke yields and increases in gaseous and liquid product yields and permitted reductions in or elimination of feed peheat while at the same time eliminating a CO pollution problem without the need for an external CO boiler. Typical present-day regeneration zones comprise a single cylindrical vessel containing a dilute phase in the upper portion of the vessel in which are located cyclone separation devices and a dense plate in the lower portion of the vessel. Spent catalyst enters the side or bottom of the vessel and fresh regeneration gas enters the bottom of the vessel and is dispersed within the dense phase by a pipe grid or perforated plate arrangement. Coke is oxidized to produce regenerated catalyst and flue gas containing CO and $CO_2$ and CO may be oxidized in the presence of sufficient catalyst to recover at least a portion of the heat of combustion. Flue gas containing entrained catalyst passes upward out of the dense phase into the dilute phase where cyclone separation devices separate entrained catalyst and direct it toward the dense phase and direct separated flue gas out of the regeneration zone. Constraints or limitations on the operation of the regeneration zone include air blower capacity, cyclone separator loading limitations, flue gas CO and particulate emission limitations, and vessel temperature limitations. During regeneration zone operation the refiner is primarily concerned with and closely monitors the degree of catalyst regeneration, the regeneration zone temperatures and the concentration of CO and particulates in the flue gas. Specifically, it is typical refinery practice to periodically withdraw regenerated catalyst samples and analyze them, by methods well known to the art, for residual carbon content as a measurement of the degree of catalyst regeneration and an indication of the cracking activity of the regenerated catalyst. Regeneration zone temperatures are routinely measured, typically by means of thermocouples, and recorded to detect changes in operation and to ensure that vessel metallurgy limitations are not exceeded. Additionally it is typical practice to periodically (or continuously) sample and analyze the flue gas for the concentrations of CO, $O_2$, $CO_2$ and particulate matter. Gas analyses may be by any method or methods known and used in the art, including the Orsat method, gas chromatography methods and mass spectroscopy methods. Particulate material may be determined by the opacity measurements or by other methods of analyses known in the art. Results from gas analyses can be used to calculate, by carbon-nitrogen-oxygen balance, such data as coke composition, coke burning rate, oxygen-containing regeneration gas requirement, heat of combustion of coke, and the amount of CO which may be burned in an external CO boiler or in the FCC regeneration zone or perhaps in both. Before the flue gas can be vented directly to the atmosphere the refiner must also know the CO and particulate concentrations to determine if the flue gas meets local CO air pollution emission limitations. The concentration of $O_2$ in the flue gas is important to ensure that the amount of oxygen-containing regeneration gas being supplied to the regeneration zone is sufficient to support the degree of CO combustion desired, whether it be partially complete or essentially complete, but not in such large excess as would be an unnecessary use of oxygen-containing regeneration gas blower capacity.

It is a feature of the method of our invention in all its embodiments that a CO oxidation promoter is added to the regeneration zone independently of the cracking catalyst. Carbon monoxide oxidation promoters which can be used broadly include metals of Groups IB, IIB, VIB, VIIB, and VIII of the Periodic Table of Elements as well as compounds thereof that can be dissolved in a solvent. Representative non-noble metals from these groups include chromium, nickel, iron, molybdenum, cobalt, copper, zinc, manganese and vanadium as well as compounds thereof. Preferred CO oxidation promoters, however, are the noble metals and compounds thereof that can be dissolved in a suitable solvent because they generally have higher catalytic activity for CO oxidation than do non-noble metals and compounds thereof. Very small quantities of these promoters are thus required to achieve the desired results. The term "noble metals" as commonly understood and used herein are the metals gold, silver, mercury, platinum, palladium, iridium, rhodium, ruthenium and osmium. More preferred for use as promoters are platinum and palladium and compounds thereof that can be dissolved in a suitable solvent with chloroplatinic acid and chloropalladic acid being particularly preferred.

In our parent application we taught that a CO oxidation promoter could be added to a regeneration zone independently of a cracking catalyst as a solid in the form of a powder or as shavings or pellets or agglomerates or dissolved or dispersed or suspended in a liquid. In the particular embodiments of our invention to which this application is directed our interest is directed to adding the promoter in a liquid and to those noble metals and compounds thereof that are soluble in a liquid. For maximum effectiveness and to best utilize the very small amounts of promoter that are required, applicants restrict the addition of the liquid containing the promoter to the regeneration zone. An advantage of adding the promoter to the regeneration zone in a liquid form is the ease of handling the promoter and controlling the amount of promoter added to the regeneration zone. A liquid containing a soluble CO oxidation promoter may be passed into a regeneration zone continuously or intermittently by fluid-flow and control devices well known to the chemical art. As an example, a small cylinder could be attached with piping or tubing to a regeneration-zone torch oil nozzle or to a probe inserted through a regeneration-zone pressure tap and the liquid containing the promoter could be pressured out of the cylinder at a flow rate controlled by a valve located in the connecting piping. Alternatively the liquid could be pumped out of a container into the nozzle or probe at a flow rate controlled by a small positive displacement pump. A liquid containing a soluble CO conversion promoter may be added to the dense phase or to the dilute phase of the regeneration zone. While a liquid containing the promoter may be passed into the regeneration zone through multiple addition points, we have found that satisfactory results can be obtained when it is added through only one addition point. A typical regeneration zone vessel contains a number of pressure taps and torch oil nozzles any one or more of which can serve as an addition point and thus very little modification to the vessel itself is required to add a liquid containing the promoter into the regeneration zone.

Suitable liquids which can be used as solvents for the CO oxidation promoters are those comprising water and hydrocarbons, particularly those hydrocarbons which are normally liquid at atmospheric temperature and pressure. Naphthas and light cycle oil are examples of such hydrocarbons. Suitable water-soluble compounds include the metal halides, preferably chlorides, nitrates, amine halides, oxides, sulfates, phosphates and other water-soluble inorganic salts. Specific examples of water-soluble compounds of noble metals are chloroplatinic acid, chloropalladic acid, palladium chloride, ruthenium tetrachloride, rhodium trichloride, rhodium nitrate and osmium trichloride. Hydrocarbon-soluble compounds include metal diketonates, carbonyls, metallocenes, olefin complexes, acetylene complexes, alkyl or aryl phosphine complexes and carboxylates. Specific examples of these are platinum acetylacetonate, palladium acetate, palladium naphthenate, triiodoiridium (III) tricarbonyl, and ($\pi$, cyclopentadienyl) (ethylene) rodium (I). Of the soluble noble metals and compounds thereof, platinum and palladium and compounds thereof that are soluble in water or a liquid hydrocarbon are preferred and those which are water soluble are particularly preferred since they tend to be more readily available than those compounds which are oil soluble. Chloroplatinic acid and chloropalladic acid are especially preferred water-soluble platinum and palladium compounds.

In order to be more useful commercially, however, it is preferred that solutions of a CO oxidation promoter have a freeze-point of 32° F. or lower so that they will still be liquid at the colder temperatures likely to be encountered in the field. More preferably, the solutions will have freeze points of about −30° F. or lower so that they will still be liquid at the coldest field temperatures likely to be encountered. Solvents which produce solutions with chloroplatinic acid or chloropalladic acid which have freeze points of 32° F. (0° C.) or lower are alcohols selected from the group consisting of saturated aliphatic alcohols having from 2 to about 8 carbon atoms per molecule and having freeze points of 32° F. or lower. Examples of such alcohols, along with their freeze points are: methanol (−98.7° C.); ethanol (−112° C.); 1-propanol (−127° C.); 2-propanol (−85.8° C.); 1-butanol (−89.2° C.); 2-butanol (−89° C.); 2,3-dimethyl-2-butanol (−14° C.); 2-methyl-2-butanol (−14° C.), 2-methyl-2-butanol (−11.9° C.); 1-pentanol (−78.5° C.); 1-hexanol (−51.6° C.); 2-ethyl-1-hexanol (−70° C.); 1-heptanol (−34.6° C.); 4-heptanol (−41.5° C.); and 1-octanol (−16.4° C.).

More preferably, the solutions of a CO oxidation promoter will have freeze points of about −30° F. (−34.4° C.) or lower so that they will still be liquid at the coldest field temperatures likely to be encountered. More preferred solvents therefore are those which produce solutions with chloroplatinic acid or chloropalladic acid having desired freeze points of −30° F. or lower. Suitable solvents are alcohols selected from the group consisting of saturated aliphatic alcohols having from 2 to about 8 carbon atoms per molecule and having freeze points of −30° F. or lower. Examples are those shown in the list above with the exception of 2,3-dimethyl-2-butanol; 2-methyl-2-butanol; and 1-octanol which three alcohols do not have freeze points of −30° F. or lower.

In addition to having a freeze point of −30° F. or lower, solutions of the preferred CO oxidation promoters chloroplatinic acid and chloropalladic acid should additionally be chemically stable so that no chemical change, as evidenced by the appearance of another liquid phase or a solid phase, will occur during anticipated storage periods. To approximate the more extreme storage conditions likely to be encountered, such solutions should be chemically stable for a 30-day period at a temperature of 145° F. (62.8° C.). Some of the above saturated aliphatic alcohols that produced solutions meeting the preferred freeze-point specification of −30° F. did not produce solutions that were chemically stable for 30 days at 145° F. Methanol, 2-propanol, 2-butanol, and 2-methyl-2-propanol for example did not produce solutions that were chemically stable for 30 days at 145° F. Additionally such common waterfreeze-point depressants as ethylene or propylene glycol met the desired freeze point specification but did not meet the desired chemical stability specifications. Solvents that did produce solutions which met both the freeze point specification of −30° F. and the chemical stability specification of no apparent chemical change after 30 days at 145° F. were alcohols selected from the group consisting of saturated aliphatic primary alcohols having from 2 to about 8 carbon atoms per molecule and freeze points of −30° F. or lower. These solvents are therefore the most preferred solvents to make my solutions, with 1-butanol and 2-ethyl-1-hexanol being particularly preferred. With the exception of methanol, the chemical stability of solutions was generally found to be best when the solvent was a staturated aliphatic primary alcohol and poorer when the solvent was a saturated aliphatic secondary or tertiary alcohol. Preferably these saturated aliphatic primary alcohols having from 2 to about 8 carbon atoms per molecule and freeze points of −30° F. or lower will be used neat with chloroplatinic or chloropalladic acid. Preferred concentrations of chloroplatinic or chloropalladic acid in a solution will be equivalent to from about 0.01 wt. % to about 10 wt. % Pt or Pd with more preferred concentrations being from about 0.01 to 5 wt. % Pt or Pd.

Our invention in its broadest embodiment is a method for regenerating coke-contaminated catalyst with simultaneous carefully-controlled combustion of CO. In this embodiment of our invention coke-contaminated catalyst is introduced into the regeneration zone and a liquid comprising a soluble CO oxidation promoter is added to the regeneration zone independently of the coke-contaminated catalyst in an amount selected to promote the combustion of CO to $CO_2$. Oxygen-containing regeneration gas is then passed into the regeneration zone in an amount to provide sufficient excess oxygen to accomplish the desired amount of CO combustion. More specifically, this amount of oxygen-containing regeneration gas will be equivalent to about 10 to about 17 pounds of air per pound of coke entering the regeneration zone per unit time, depending upon whether the CO combustion is to be partially complete or essentially complete. We have found that it is preferred that the promoter be added first to the regeneration zone and then the oxygen-containing regeneration gas so that smooth, controlled, catalyzed conversion of CO can be initiated from the start and the risk of afterburning minimized. If that amount of oxygen-containing regeneration gas is added to the regeneration zone first and the promoter added secondly there may be some risk that afterburning will be initiated first rather than the desired controlled conversion of CO in the presence of promoter and regenerated catalyst. A first portion of the oxygen-containing regeneration gas will then be reacted with the coke-contaminated catalyst in the regeneration zone at oxidation conditions selected to remove coke from the catalyst and to produce a flue gas containing CO and sufficient to cause combustion of CO to $CO_2$ in the presence of the oxidation promoter. Oxidation conditions will include, in addition to the presence of the oxygen-containing regeneration gas described above, temperatures within the range of from about 1100° F. to about 1450° F. and a pressure within the range of from about atmospheric to about 50 psig. At such conditions coke oxidation will be essentially spontaneous. Essentially simultaneously the flue gas and a second portion of the oxygen-containing regeneration gas will be contacted with the CO oxidation promoter at the oxidation conditions previously described thereby making a controlled quantity of exothermic heat of reaction available for operation of the regeneration zone and decreasing the amount of CO in the flue gas. By monitoring regeneration-zone temperatures and flue-gas compositions, increased CO oxidation within the regeneration zone will be noted within a very short time after the liquid is added to the regeneration zone. The amount of liquid added to the regeneration zone may be that required to obtain any of several certain desirable results such as, in one embodiment, a desired concentration of CO in the flue gas or, in another embodiment, a desired degree of catalyst regeneration or, in still another embodiment, a desired regenerated-catalyst temperature or, in yet another embodiment, a desired regeneration-zone temperature. Any one of these results may be achieved independently of the other. For instance, one refiner may be primarily interested in controlling the CO concentration in the flue gas within a predetermined range and, if the regeneration zone metallurgy is such that expected temperatures pose no problem, he will accept the regeneration zone temperatures and degree of regeneration that result when the CO concentration is controlled. Another refiner may be primarily concerned about regeneration-zone temperatures because of metallurgy limitations and will control a regeneration-zone temperature within a predetermined range and accept the flue gas CO concentration and degree of regeneration that result from such control. When the amount of CO oxidation promoter is to be added to achieve any one of these results, liquid will usually be added in small increments and the desired dependent variable (whether flue gas CO concentration or residual carbon concentration on regenerated catalyst or a temperature) will be measured and compared with the desired result to determine whether another increment of liquid containing a CO oxidation promoter is needed. Specifically, if after adding a small increment of liquid to the regeneration zone the measured concentration of CO in the flue gas or the concentration of residual carbon on regenerated catalyst or the regenerated-catalyst temperature or a regeneration-zone temperature is not within a predetermined range for each, a second increment of liquid will be added and if necessary additional increments will be added until the measured variable falls within the predetermined range. Adding the liquid in several small increments, each over a relatively short period of time of from a few minutes to a few hours, allows the refiner to more closely control and monitor the operation of the regeneration zone to achieve the desired result. Whether the liquid is added in one or several increments the total amount of liquid added to achieve a desired result will typically be that needed to add CO oxidation promoter equivalent to from about 0.1 to about 30 wt. ppm. of the circulating catalyst on an elemental metal basis and more typically from about 0.1 to about 15 wt. ppm. of the circulating catalyst on an elemental metal basis. Thus for a typical FCC unit with a circulating catalyst inventory of 75 tons of fluid cracking catalyst the amount of liquid added will be that to add CO oxidation promoter equivalent to from about 0.015 lb. to about 4.50 lb. and more preferably from about 0.015 lb. to about 2.25 lb. on an elemental metal basis.

Once the measured variable is within or less than the predetermined range for that variable then the liquid containing promoter will be added continuously or intermittently in a second amount as necessary to maintain the measured variable within the predetermined range. While the second amount of liquid required to maintain a variable within a predetermined range can vary somewhat from unit to unit and is best determined by operating experience on a particular unit, we have found that the second amount of liquid necessary on an average daily basis to maintain a variable within a predetermined range will typically be that required to add CO oxidation promoter equivalent to from about 0.005 to about 10 wt. ppm. of the circulating catalyst inventory on an elemental metal basis. Thus for a FCC unit with 75 tons of circulating catalyst inventory a second amount of liquid to be added to maintain CO oxidation activity of the mixture will be that required to add CO oxidation promoter on an average daily basis equivalent to from about 0.341 gms to about 681 gms on an elemental metal basis.

The type of cracking catalyst used in FCC processes employing the methods of this invention is not critical and can be any type of cracking catalyst used or intended for use in the FCC process including the amorphous catalysts or crystalline aluminosilicate catalysts, or mixtures of the two. Of these two broad types of cracking catalysts, those comprising crystalline aluminosilicates are preferred because of the reduced coke yields and increased gaseous and liquid product yields they produce as compared to those obtained with amorphous catalysts. Obviously, those FCC catalysts now being offered and used commercially which contain a CO promoter as a component of the catalyst need not be used in the methods of our invention. Besides being considerably more expensive than non-promoted catalysts, such catalysts, as previously pointed out, do not offer the refiner the flexibility of our invention. Since CO is now oxidized as a fuel in addition to coke within the regeneration zone and at least a portion of the heat of CO combustion is recovered within the regeneration zone, the cracking system of the FCC process can now be as selective for more valuable products as the hydrocarbon conversion zone operating conditions and the cracking catalyst will permit. Hydrocarbon conversion zone operating conditions will therefore be selected for maximum gaseous and liquid product yields and will typically include a temperature within the range of from about 800° F. to about 1100° F., a pressure within the range of from about atmospheric to about 50 psig., a catalyst to oil ratio of from about 3 to about 20 and a hydrocarbon residence time in contact with catalyst of from about 1 to about 30 seconds and more preferably from about 1 to about 10 seconds. Feedstocks used in FCC processes employing the method of this invention need be no different than those used in FCC processes not employing our method and can include any conventional hydrocabon feedstock such as naphthas, gas oils, light and heavy distillates, residual oils and the like.

The following examples are intended for illustration purposes only and references to specific promoters, concentrations of promoters, operating conditions or methods of addition to the regeneration zone are not to be construed as unnecessary limitations upon the scope and spirit of the claims attached hereto.

EXAMPLE I

This example describes pilot plant FCC regeneration zone tests that were performed to establish the effectiveness of adding a liquid containing low concentrations of particular promoters to the regeneration zone of an FCC unit for reducing the concentration of CO in the flue gas. The tests were conducted using a vertical tubular vessel the upper end of which was fitted with a porous stainless steel filter for confining within the vessel during the operation sequence the catalyst sample that was loaded into the vessel and the lower end of which contained an inlet means for the fluidizing medium (nitrogen or air) and an inlet means for the liquid containing the promoter. Provision was made to heat the vessel to a constant temperature and chromatographic equipment was provided to sample and analyze the flue gas from the vessel for CO, $CO_2$ and $O_2$ thereby providing an instantaneous composition to characterize the reduction in the CO concentration.

Each test was run with a 500 gram sample of spent zeolite-containing cracking catalyst which contained about 0.9 wt. % coke. The coke had been deposited on the catalyst by passing gas oil feedstock over cleanly-regenerated catalyst in a pilot-plant-scale hydrocarbon-reaction zone operated at a standard set of operating conditions with a predetermined sequence of operating steps.

For Test 1 no liquid containing a promoter was added to the vessel during the operating sequence; the test was conducted to establish a basis for comparison with tests where the method of the invention was employed. A 500 gram sample of spent catalyst was loaded into the vessel and fluidized with nitrogen entering the bottom of the vessel while the system was heated to a temperature of 1100° F. At a specified time nitrogen was replaced with air thereby initiating the oxidation of coke. The flue gas from the vessel had CO concentrations as determined by the chromatographic equipment at various times after introducing air as indicated in Table 1:

TABLE 1

| Pilot Plant Regeneration Zone Test 1 No CO Oxidation Promoter Flue Gas CO Concentrations | | |
|---|---|---|
| Time (min.) | % CO in dry flue gas | $CO_2$/CO Ratio |
| 1 | 2.4 | 3.09 |
| 2 | 3.5 | 3.00 |
| 3 | 5.0 | 2.86 |
| 4 | 6.0 | 2.58 |
| 5 | 5.7 | 2.96 |

As shown above, the $CO_2$/CO ratio during the test remained in the rather narrow range of from about 2.5 to about 3.0.

Test 2 was conducted in the same manner as Test 1 except that 15 seconds after the fluidizing nitrogen was switched to air, and while the CO concentration was observed to be increasing, a 30 cc. sample of dilute chloroplatinic acid ($H_2PtCl_6$) solution was injected into the vessel. The solution was prepared by diluting chloroplatinic acid containing about 28.6 wt. % Pt with distilled water to produce dilute chloroplatinic acid containing 0.1 mg. Pt/cc. This amount of chloroplatinic acid is equivalent to about 6.0 wt. ppm. of the catalyst sample as Pt metal. From instantaneous chromatographic readings it became apparent that the CO concentration was now being reduced. As the test continued the flue gas had the following compositions:

TABLE 2

| PIlot Plant Regeneration Zone Test 2 Dilute Chloroplatinic Acid (0.1 mg. Pt/cc) Flue Gas CO Concentrations | | |
|---|---|---|
| Time (min.) | % CO in dry flue gas | $CO_2$/CO Ratio |
| 1 | 1.7 | 9.3 |

TABLE 2-continued

Pilot Plant Regeneration Zone Test 2
Dilute Chloroplatinic Acid (0.1 mg. Pt/cc)
Flue Gas CO Concentrations

| Time (min.) | % CO in dry flue gas | $CO_2/CO$ Ratio |
|---|---|---|
| 2 | <0.1 | >100 |
| 3 | <0.1 | >100 |

Carbon monoxide concentrations are much reduced and $CO_2/CO$ ratios are much higher than those of Test 1 for the same time intervals. To test how quickly the platinum lost effectiveness for reducing the CO concentration, the regenerated catalyst from Test 2 was used for additional cycles in a pilot plant scale hydrocarbon reaction zone and then in the regeneration zone with no addition of promoter. After the first three additional cycles through the hydrocarbon reaction zone and regeneration zone essentially no CO formation was noted as the coke was burned, but starting with the fourth cycle a small quantity of CO was present in the flue gas although the amount was considerably less than that for Test 1 when no promoter was used.

The same procedure was employed with a new 500 gram catalyst sample for Test 3 except that a more dilute solution was utilized and the liquid containing the promoter was added to the vessel just before the fluidizing nitrogen was switched to air. In this test 25 cc. of more dilute chloroplatinic acid, equivalent to about 0.5 wt. ppm. of the catalyst as Pt metal, were added to the vessel. The solution was prepared by diluting a portion of the solution that was used for Test 2 which contained 0.1 mg. Pt/cc with distilled water to produce a more dilute solution of chloroplatinic acid containing 0.01 mg. Pt/cc. Flue gas CO concentrations were as follows:

TABLE 3

Pilot Plant Regeneration Zone Test 3
Dilute Chloroplatinic Acid (0.01 mg. Pt/cc)
Flue Gas CO Concentrations

| Time (min.) | % CO in dry flue gas | $CO_2/CO$ Ratio |
|---|---|---|
| 1 | 0.6 | 20.8 |
| 2 | <0.1 | >100 |
| 3 | <0.1 | >100 |

Although the reduced amount of promoter used in this test appeared to produce results comparable to those obtained with a higher promoter concentration in Test 2, the regenerated catalyst appeared to lose much of its promoter effectiveness very quickly as subsequent cycles showed the presence of some CO during the regeneration sequence. After three cycles it appeared that the catalyst produced about two-thirds as much CO as was produced during Test 1 when no promoter was added.

In Test 4, 25 cc. of a solution of chloropalladic acid in water containing 0.1 mg. Pd/cc, equivalent to about 5 wt. ppm. of the catalyst sample as Pd metal, was injected into the vessel 15 seconds after the fluidizing nitrogen had been switched to air thus initiating combustion. Within two minutes the CO concentration in the flue gas had fallen to less than 0.2 vol. %

EXAMPLE II

This example describes the behavior of a regeneration zone of a commercial fluid catalytic cracking process shortly after the addition of small amounts of a liquid containing a CO oxidation promoter by the method of our invention without any other operational changes being made.

The particular FCC unit was processing about 18,670 B/D of a mixture of vacuum and coker gas oils and had a circulating catalyst inventory of about 60 tons of zeolite-containing catalyst. The unit was lined out at typical operating conditions without attempting to partially or essentially completely reduce the CO concentration in the flue gas and without the presence of a CO conversion promoter in the regeneration zone. A summary of some of these process operating conditions before any promoter was added to the regeneration zone is shown in Table 4 below. Two liters of a solution of chloroplatinic acid in water were then pressured out of a cylinder into the regeneration zone within a 2-3 minute period through an instrument density tap located in the regeneration zone. The dilute chloroplatinic acid solution was prepared by diluting 61.4 grams of concentrated chloroplatinic acid (28.637 wt. % Pt) to 2 liters volume using distilled water. Passing this amount of solution into the regeneration zone added promoter equivalent to about 0.32 wt. ppm. of circulating catalyst inventory as Pt metal. The regeneration zone almost immediately responded to this addition; the CO concentration in the flue gas was reduced to about half of that before the solution was added and the regeneration zone densephase temperature rose about 45° F. above that before the addition of the solution. No other operational changes to the process were made. A summary of operating conditions after this first addition of solution is also shown in Table 4. Several hours later a smaller amount of solution containing promoter equivalent to about 0.13 wt. ppm. of circulating catalyst inventory as Pt metal was added to the regeneration zone in the same manner as the first addition. Except for the addition of the promoter no other operational changes were made to the process. A summary of operating conditions shortly after this second addition is also shown in Table 4 below.

TABLE 4

Response of Commercial FCC Regeneration Zone to Addition of Promoter
Selected Operating Conditions

| | Start | After Addition of 0.32 wt. ppm. Pt | After Addition of 0.13 wt. ppm. Pt |
|---|---|---|---|
| Temperatures ° F. | | | |
| Regeneration zone dense phase | 1211 | 1257 | 1316 |
| Regeneration zone dilute phase | 1221 | 1268 | 1323 |
| Regeneration zone flue gas | 1233 | 1253 | 1298 |
| Hydrocarbon reactor zone | 950 | 952 | 952 |
| Combined feed | 623 | 623 | 624 |
| Flue Gas Composition, Vol. % | | | |
| CO | 10.5 | 5.9 | 1.4 |
| $CO_2$ | 10.8 | 12.8 | 17.1 |
| $O_2$ | 0.0 | 0.0 | 0.0 |
| $CO_2/CO$ | 1.03 | 2.17 | 12.2 |
| Residual Carbon on Regen. Catalyst, wt.% | 0.30 | 0.16 | 0.06 |
| Fresh Feed Rate, BPSD | 18670 | 18670 | 18670 |
| Recycle Rate, BPSD | 1654 | 1654 | 1654 |
| Air Rate, SCFM | 30822 | 30822 | 30822 |

As shown by the data in Table 4, the CO concentration in the flue gas decreased from 10.5 vol. % before the addition of any promoter solution to 5.9 vol. % after the addition of the first amount of solution (0.32 wt. ppm. Pt) to 1.4 vol. % after the addition of the second amount of solution (0.13 wt. ppm. Pt). Carbon on regenerated catalyst decreased from 0.30 wt. % to 0.16 wt. % after the addition of the first amount of solution and then to 0.06 wt. % after the addition of the second amount of solution while the regeneration zone dense phase temperature increased from 1211° F. to 1257° F. to 1316° F. after the additions of the respective amounts of solution. Other regeneration zone temperatures increased also but not as much as did the dense-phase temperature.

EXAMPLE III

This example describes the use of our invention in the same commercial unit as was used in Example II and indicates the advantages obtained by such use. Before the addition of the two amounts of promoter solution was made as described in Example II, a rather complete test, Test 1, was conducted for comparison with subsequent tests to be made when promoter solution was to be added to the regeneration zone. During the day following the addition of the first two amounts of promoter solution two more amounts of promoter solution containing promoter equivalent respectively to about 0.13 and 0.32 wt. ppm. of the circulating catalyst inventory as Pt metal, were made in the manner previously described in Example II. This time, however, the air rate to the regeneration zone was increased to ensure sufficient oxygen for essentially complete conversion of CO to $CO_2$. During steady state operation, when CO was being essentially completely burned within the regeneration zone in the presence of the mixture of CO conversion promoter and regenerated catalyst, Test 2 was then conducted. At the time of Test 2 the total amount of diluted chloroplatinic acid which had been passed into the regeneration zone added CO oxidation promoter equivalent to about 0.9 wt. ppm. of the circulating catalyst inventory as Pt metal. Test 2 was run at essentially the same feed rate, regeneration zone and hydrocarbon reaction zone pressures as those for Test 1. No attempt was made before starting Test 2 to achieve the same conversion level as that obtained for Test 1 nor was any attempt made to optimize the flow rate of air needed to achieve essentially complete CO conversion. Results for Test 1 and Test 2 are shown in Table 5.

TABLE 5
Comparative FCC Operations Before and After Addition of CO Conversion Promoter

| TEST | 1 Before | 2 After |
|---|---|---|
| Processing Conditions | | |
| Hydrocarbon Reaction Zone | | |
| Temp., ° F. | 950 | 941 |
| Combined Feed temp., ° F | 623 | 595 |
| Regeneration Zone | | |
| Dense phase temp., ° F | 1212 | 1284 |
| Dilute phase temp., ° F. | 1222 | 1290 |
| Flue gas temp., ° F. | 1233 | 1310 |
| Carbon on Regen. Cat., wt. % | 0.28 | 0.11 |
| Flue Gas Analysis, vol. % | | |
| $CO_2$ | 10.5 | 14.1 |
| CO | 9.6 | <0.1 |
| $O_2$ | 0.0 | 3.5 |
| $CO_2$/CO | 1.09 | >140 |
| Product Yields | | |
| $C_2$ and lighter, wt. % | 2.7 | 2.4 |
| Propylene, vol. % | 8.5 | 8.2 |
| Propane, vol. % | 2.5 | 2.5 |
| Isobutane, vol. % | 6.1 | 5.5 |
| N-butane, vol. % | 1.7 | 1.6 |
| Butenes, vol. % | 9.1 | 9.2 |
| $C_5$+ Gasoline, vol. % | 57.6 | 57.4 |
| Light Cycle Oil, vol. % | 20.1 | 21.2 |
| Slurry Oil, vol. % | 3.1 | 3.8 |
| Coke, wt. % | 5.4 | 4.3 |
| Conversion, vol. % | 79.7 | 78.0 |

A comparison of the test data shows a reduction in the CO concentration of the flue gas from 10.5 vol. % to <0.1 vol. %, a reduction in carbon on regenerated catalyst of from 0.28 wt. % to 0.11 wt. % (indicating a better catalyst regeneration) and a general increase in regeneration zone temperatures of from about 70° to 80° F. by using the method of our invention. Although the hydrocarbon-reaction-zone temperatures are not quite the same, recovery of a portion of the heat of CO combustion within the regeneration zone in Test 2 has permitted a reduction in the combined-feed temperature. Although the conversion for Test 2 was about 1.7% less than that of Test 1, a comparison of the yields indicates that more selective cracking to more valuable products was obtained for Test 2 than for Test 1. The coke yield for Test 2 was 4.3 Wt. % compared to 5.4 wt. % for Test 1 and even though conversion was 1.7% less for Test 2 than for Test 1 the gasoline yield for Test 2 was 57.4 vol. % compared to 57.6 vol. % for Test 1.

Subsequent experience on this same commercial unit demonstrated that essentially complete conversion of CO could be maintained by passing into the regeneration zone on an average daily basis amounts of promoter solution containing promoter equivalent to about 0.12 wt. ppm. of the circulating catalyst inventory as Pt metal.

Platinum analysis of catalyst samples from this commercial unit indicate that a sizeable portion of the promoter is being retained on the cracking catalyst. As an example, at a time when a total amount of chloroplatinic acid solution containing a total amount of promoter equivalent to 75 g. of Pt had been added to this commercial unit a sample of equilibrium catalyst was withdrawn from the unit and analyzed for Pt concentration. The measured value from this sample was 1.0 wt. ppm. Pt. If all of the 75 g. of Pt that had been passed into the unit were equally distributed over 60 tons of inventory a concentration of 1.4 wt. ppm. Pt on the equilibrium catalyst would have been expected.

EXAMPLE IV

This example generally illustrates the problem of solution chemical instability. More specifically it illustrates the chemical instability of a solution of chloroplatinic acid in a mixture of water and a common water-freeze-point depressant, ethylene glycol. Chloroplatinic acid containing 25.46 wt. % Pt was dissolved in a 1:1 (by weight) blend of technical grade ethylene glycol and distilled water as well as tap water to obtain two solutions each containing 0.045 wt. % Pt. These two solutions were evaluated for solubility characteristics at −20° F. and for thermal stability at 72°, 110°, and 145° F. The data in Table 6 below show that the solutions were fluid at −20° F. but that they did not possess the desired chemical stability for 30 days at 145° F; a black precipitate was formed in about 11 days at 72° F. and in only 0.7 days at 145° F. The black precipitate was separated by centrifuging, washed with water and analyzed for Pt content. The Pt elemental content of the black precipitate was found to be 94% and electron spectroscopy chemical analysis indicated the presence of principally Pt° with about 5% PtO. Platinum recovery from the precipitate, the flasks and the clear solution was equal to 100.3% of that originally used. These data indicate the black precipitate to be Pt° suggesting a reduction of the $Pt^{+4}$ in the chloroplatinic acid to Pt° and the oxidation of the theylene glycol. Ethylene glycol oxidation products were not identified.

TABLE 6

Stability of Chloroplatinic Acid in Blend of Ethylene Glycol and Water

| Sample | Type of Water | Days to Formation of Precipitate | | | |
|---|---|---|---|---|---|
| | | −20° F. | 72° F. | 110° F. | 145° F. |
| 1 | Distilled | Soluble | ∼ 11 | 4 | 0.7 |
| 2 | Tap | Soluble | ∼ 11 | 0.7 | 0.7 |

EXAMPLE V

This example presents freeze point and chemical stability data at selected temperatures of −32° F., 72° F., 145° F. for 10 solutions of chloroplatinic acid (CPA), in a concentration equivalent to 0.045 wt. % Pt, in various neat, reagent-grade primary secondary, or tertiary alcohols or mixtures thereof. A temperature of −32° F. was selected to simulate the coldest temperature that might be encountered in the field; 72° F. was selected to simulate average ambient conditions and 145° F. was selected to simulate average storage (indoor and outdoor) conditions. The days to appearance of a black precipitate, most probably Pt°, was noted for each temperature. Data are summarized in Table 7 below.

TABLE 7

STABILITY OF CPA[5] IN VARIOUS SOLVENTS AT VARIOUS TEMPERATURES

| Solution No. | Solvent | | | | Days to Formation of Precipitate | | |
|---|---|---|---|---|---|---|---|
| | Type | M.P., °C[1] | B.P., °C[1] | F.P.[2], °F[1] | −32° F. | 72° F. | 145° F. |
| 1 | Methanol | −97.8 | 64.7 | 54 | N.D.[4] | 14 | 0.25 |
| 2 | Ethanol | −112 | 78.4 | 54 | Liquid | >61 | 44 |
| 3 | 1-Propanol | −127 | 97.8 | 60–85 | Liquid | >61 | >58 |
| 4 | 2-Propanol | −85.8 | 82.5 | 53–60 | N.D. | 7 | 1 |
| 5 | 1-Butanol | −89.2 | 117 | 98[3] | Liquid | >63 | 50 |
| 6 | 2-Butanol | −89 | 99.5 | 75 | N.D. | 56 | 2 |
| 7 | 2-methyl-2-propanol | 25 | 82.9 | 52 | Solid | 22 | 13 |
| 8 | 1-Hexanol | −51.6 | 157.2 | 165 | Liquid | >56 | 42 |
| 9 | 2-ethyl-1-hexanol | −70 | 184.3 | 184 | >60 | >60 | >60 |
| 10 | Ethanol + 1-butanol (1:1) | — | — | — | N.D. | >48 | >48 |

[1] Literature values
[2] Flash Point, Cleveland Closed Cup
[3] Penske-Martens closed cup determinations
[4] N.D. = Not Determined
[5] CPA concentration in each solution equivalent to 0.045 wt. % Pt Chemical stability of chloroplatinic acid is best for saturated aliphatic primary alcohols (with the exception of methyl alcohol) and poorer for the saturated aliphatic secondary and tertiary alcohols. In addition to being suitable because of poor chemical stability, the CPA-2-methyl-2-propanol solution was solid at −32° F. A ranking of solutions of CPA in various solvents in order of decreasing chemical stability at 145° F. is: 2-ethyl-1-hexanol (greater than 60 days); 1-propanol (greater than 58 days); 1-butanol (50 days); ethanol and 1-hexanol (42–44 days); 2-methyl-2-propanol (13 days); 2-propanol and 2-butanol (1–2 days); and methanol (0.25 days).

EXAMPLE VI

This example describes pilot plant regeneration-zone tests that were performed to establish the effectiveness of a solution containing chloroplatinic acid in 1-butanol for reducing the concentration of CO in the flue gas. The tests were conducted using the test apparatus described in Example I. As in Example I provision was made to heat the apparatus to a constant temperature and chromatographic equipment was provided to continuously sample and analyze the flue gas from the vessel for CO, $CO_2$ and $O_2$. A chormatographic trace for CO, $CO_2$ and $O_2$ was recorded thereby providing instantaneous analyses to characterize the combustion of CO during the test. A specific $CO_2/CO$ ratio, referred to as the minimum $CO_2/CO$ ratio, was calculated from the chromatographic traces for each test by first determining the maximum CO concentration for the test (which usually occurred within 2 to 3 minutes after the combustion was initiated), determining the $CO_2$ concentration at the instant of maximum CO concentration and then calculating the $CO_2/CO$ ratio for the concentrations thus determined. The ratio is referred to as the minimum $CO_2/CO$ ratio because we have observed from many such regeneration tests that if instantaneous $CO_2/CO$ ratios were plotted against elapsed time for each test a curve would be generated which would pass through a minimum $CO_2/CO$ ratio having a value as calculated by the method explained above. This minimum $CO_2/CO$ ratio we have found best characterizes the performance of any solution containing a CO promoter in catalyzing CO combustion.

The tests were run on 500 gram samples of equilibrium zeolite-containing FCC catalyst which had first been "spent" by passing gas oil feed over the equilibrium catalyst sample in a pilot-plant-scale hydrocarbon reaction zone which was operated at a standard set of conditions with a predetermined sequence of operating steps. Each spent catalyst sample contained about 0.9 wt. % coke.

For Test 1 no solution containing a promoter was used; the test was conducted to establish a basis for comparison with a subsequent test in which a solution containing a promoter was employed. A 500 gram sample of spent catalyst was loaded into the vessel and fluidized with nitrogen entering the bottom of the vessel while the system was heated to a temperature of 1100° F. At a specified time nitrogen was replaced with air thereby initiating the oxidation of coke. The flue gas from the vessel was analyzed for $CO_2$, CO and $O_2$ by the chromatographic equipment and from the traces for $CO_2$ and CO the minimum $CO_2/CO$ ratio was calculated. To establish some measure of the reproducibility of the results obtained by the test method, the test was repeated with separate samples of spent catalyst a total of four times. Minimum $CO_2/CO$ ratios ranging from 2.5 to 3.3 are shown in Table 8 below.

Test 2 was conducted in the same manner as Test 1 except that just before the fluidizing nitrogen was switched to air a 25 g. sample of a solution of chloroplatinic acid in 1-butanol was injected into the regeneration zone. The concentration of chloroplatinic acid in the sample was equivalent to 0.008 wt. % Pt and the amount of platinum in the sample was 2 mg. Pt or 4 wt. ppm. of the 500 g. catalyst sample. A minimum $CO_2/CO$ ratio of 52.1 was obtained and then to obtain some measure of the rate at which the mixture of particles of promoter and particles of regenerated catalyst lost effectiveness for reducing the CO concentration in the flue gas the mixture was run through more cycles. Specifically, to complete another cycle the mixture was "spent" in the pilot-plant-scale hydrocarbon reaction zone as described above and the regeneration-zone test was repeated but without the addition of any additional amounts of promoter solution. At the end of the seventh cycle the minimum $CO_2/CO$ ratio for the mixture was 41.5 indicating that the mixture had retained most of its CO-burning activity. Results for Test 1 and 2 are summarized in Table 8

TABLE 8

Pilot Plant Regeneration Zone Tests With And Without The Use of a Promoter Solution

| Cycle | Minimun $CO_2/CO$ Ratios | | | | | | |
|---|---|---|---|---|---|---|---|
|  | 1 | 2 | 3 | 4 | 5 | 6 | 7 |
| Test 1 (No promoter solution used) | 3.3 | — | — | — | — | — | — |
|  | 2.5 | — | — | — | — | — | — |
|  | 3.1 | — | — | — | — | — | — |
|  | 3.0 | — | — | — | — | — | — |
| Test 2 (25 g. of CPA-1-butanol solution containing 0.008 wt. % Pt.) | 52.1 | — | — | — | — | — | 41.5 |

Solutions of CPA in other preferred solvents are expected to exhibit behavior similar to that of the solution of CPA in 1-butanol used for this example.

We claim as our invention:

1. A method for regenerating a coke-contaminated catalyst which has become spent as a result of its use in a hydrocarbon cracking reactor with simultaneous carefully-controlled combustion of CO which comprises the steps of:
   (a) introducing said coke-contaminated catalyst into a catalyst regeneration zone;
   (b) passing into said regeneration zone, independently of coke-contaminated catalyst and free of the reactor feed stock and in an amount equivalent to from about 0.1 to about 30 wt. ppm of the circulating catalyst inventory on an elemental metal basis to promote the combustion of CO to $CO_2$, a solution comprising a CO oxidation promoter consisting essentially of noble metal compounds in a solvent selected from the group consisting of water and hydrocarbons;
   (c) passing an oxygen-containing regeneration gas into said regeneration zone in an amount selected to burn coke from said coke-contaminated catalyst and to provide sufficient excess oxygen to accomplish the desired amount of CO combustion;
   (d) reacting a first portion of said oxygen-containing regeneration gas with said coke-contaminated catalyst in said regeneration zone at oxidation conditions including a temperature within the range of from about 1100° F to about 1450° F and a pressure in the range of from about atmospheric to about 50 psig selected to remove coke from said coke-contaminated catalyst, to produce a flue gas containing CO and sufficient to cause combustion of CO to $CO_2$ in the presence of said oxidation promoter thereby producing regenerated catalyst and flue gas; and
   (e) simultaneously contacting said flue gas and a second portion of said oxygen-containing regeneration gas with said CO oxidation promoter in said regeneration zone in the presence of said regenerated catalyst at said oxidation conditions, thereby (i) making a controlled quantity of exothermic heat of reaction available for operation of said regeneration zone, and (ii) decreasing the amount of CO in said flue gas to a CO concentration such that the $CO_2$ to CO ratio is greater than about 1.5.

2. A method as defined in claim 1 wherein the amount of solution passed into said regeneration zone is selected to produce flue gas containing CO in an amount equal to or less than a 1000 ppm.

3. A method as defined in claim 1 wherein the amount of solution passed into said regeneration zone in step (b) is selected to release an amount of exothermic heat of reaction sufficient to raise the average combustion temperature in said zone to a level effective to produce a regenerated catalyst containing residual carbon in an amount less than or equal to a predetermined value.

4. A method as defined in claim 1 wherein the amount of solution passed into said regeneration zone in step (b) is selected to release an amount of exothermic heat of reaction sufficient to raise the temperature of said regenerated catalyst to a predetermined level.

5. A method as defined in claim 1 wherein the amount of solution passed into said regeneration zone in step (b) is adjusted to a value sufficient to insure that substantially all of the heat released from the exothermic combustion of carbon monoxide occurs in the presence of regenerated catalyst thereby enabling control of the temperature of said flue gas below a predetermined level.

6. A method as defined in claim 1 wherein the amount of solution passed into said regeneration zone in step (b) is adjusted in conjunction with an amount of diluent gas passed to said zone to enable control of the temperature of said flue gas below a predetermined level.

7. A method as defined in claim 1 wherein said noble metal compound is selected from the group consisting of platinum compounds and palladium compounds.

8. The method of claim 7 wherein said noble metal compound is chloroplatinic acid or chloropalladic acid.

9. In a process for regenerating a coke-contaminated catalyst, which has become spent as a result of its use in a hydrocarbon cracking reactor, wherein said coke-contaminated catalyst and an oxygen-containing regeneration gas are passed into a regeneration zone maintained at coke oxidizing conditions which includes a temperature within the range of from about 1100° F to 1450° F and a pressure in the range of from about atmospheric to about 50 psig and wherein coke is oxidized to produce a regenerated catalyst and a flue gas containing carbon dioxide and carbon monoxide, a method of using the in situ combustion of CO to $CO_2$ to control the operation of said regeneration zone which comprises the steps of:
   (a) passing into said regeneration zone, independently of the coke-contaiminated catalyst and free of the reactor feed stock and in an amount equivalent to from about 0.1 to about 30 wt. ppm of the circulating catalyst inventory on an elemental metal basis selected to initiate and sustain CO combustion in said zone in the presence of said regenerated catalyst, a solution comprising a CO oxidation promoter consisting essentially of noble metal compounds in a solvent selected from the group consisting of water and a hydrocarbon; and, (b) thereafter adjusting the amount of said oxygen-containing regeneration gas being passed to said regeneration zone to a value stoichiometrically sufficient to burn said coke from said contaminated catalyst and to convert at least a portion of the CO to $CO_2$, thereby (i) making a controlled quantity of exothermic heat of reaction available for operation of said regeneration zone and (ii) decreasing the amount of CO in said flue gas to a concentration such that the $CO_2$ to CO ratio is greater than about 1.5.

10. A method as defined in claim 9 wherein said amount of solution passed into said regeneration zone is selected to produce flue gas containing CO in an amount equal to or less than 1000 ppm.

11. A method as defined in claim 9 wherein said amount of solution independently passed into said regeneration zone in step (a) is selected to release an amount of exothermic heat of reaction sufficient to raise the average combustion temperature in said zone to a level effective to produce a regenerated catalyst containing residual carbon in an amount less than or equal to a predetermined value.

12. A method as defined in claim 9 wherein said amount of solution independently passed into said regeneration zone in step (a) is selected to release an amount of exothermic heat of reaction to raise a temperature of the regenerated catalyst to a predetermined level.

13. A method as defined in claim 9 wherein the amount of solution independently passed into said zone in step (a) is adjusted to a value sufficient to insure that substantially all of the heat released from the exothermic combustion of carbon monoxide occurs in the presence of said regenerated catalyst thereby enabling control of a temperature of said flue gas below a predetermined level.

14. A method as defined in claim 9 wherein the amount of solution independently passed into said zone in step (a) is adjusted in conjunction with an amount of diluent gas passed to said zone to enable control of a temperature of the flue gas below a predetermined level.

15. A method as defined in claim 9 wherein said noble metal is selected from the group consisting of platinum compounds and palladium compounds.

16. A method as defined in claim 9 wherein said noble metal compound is chloroplatinic acid or chloropalladic acid.

17. In a process for regenerating a coke-contaminated catalyst which has become spent as a result of its use in a hydrocarbon cracking reactor wherein said coke-contaminated catalyst and an oxygen-containing regeneration gas are passed into a regeneration zone maintained at oxidizing conditions which include a temperature within the range of from about 1100° to 1450° F and a pressure in the range of from about atmospheric to about 50 psig and coke is therein oxidized to produce regenerated catalyst and flue gas containing $CO_2$ and CO, a method of controlling the CO concentration in said flue gas within a predetermined CO concentration range such that the $CO_2$ to CO ratio is greater than about 1.5 which method comprises the steps of:

(a) passing into said regeneration zone independently of said coke-contaminated catalyst and free of the reactor feed stock a first amount equivalent to from about 0.1 to about 30 wt. ppm of the circulating catalyst inventor on an elemental metal basis of a solution comprising a CO oxidation promoter selected from the group consisting of a platinum compound and a palladium compound in a solvent comprising water or a hydrocarbon compound;

(b) passing into said regeneration zone said oxygen-containing regeneration gas in an amount stoichiometrically sufficient to convert at least a portion of the CO to $CO_2$;

(c) converting in said regeneration zone, at conversion conditions including the presence of said CO oxidation promoter and regenerated catalyst, at least a portion of the CO to $CO_2$ to produce flue gas containing $CO_2$ and CO;

(d) analyzing said flue gas to determine a measured CO concentration and comparing said measured CO concentration with said predetermined CO concentration range; and, (e) passing into said regeneration zone a second amount of said solution equivalent to from about 0.005 to about 10 wt. ppm of the circulating catalyst inventory on an elemental metal basis sufficient to maintain said measured CO concentration within said predetermined CO concentration range.

18. A method as described in claim 17 wherein said platinum compound is chloroplatinic acid.

19. A method as described in claim 17 wherein said first amount of solution passed into said regeneration zone in step (a) is that required to add promoter equivalent to from about 0.1 to about 15 wt. ppm. of the circulating catalyst inventory on an elemental metal basis.

20. A method as described in claim 17 wherein the amount of oxygen-containing regeneration gas is equivalent to about 10 to about 17 pounds of air per pound of coke entering the regeneration zone per unit time.

21. A method as described in claim 17 wherein said palladium compound is chloropalladic acid.

22. In a process for rengenerating a coke-contaminated catalyst which has become spent as a result of its use in a hydrocarbon cracking reactor wherein said coke-contaminated cracking catalyst and an oxygen-containing regeneration gas are passed to a regeneration zone maintained at oxidizing conditions which includes a temperature within the range of from about 1100° to 1450° F and a pressure in the range of from about atmospheric to about 50 psig and coke is therein oxidized to produce regenerated catalyst and flue gas containing $CO_2$ and CO, a method of controlling a regeneration zone temperature within a predetermined temperature range which method comprises the steps of:

(a) passing into said regeneration zone a first amount of a solution equivalent to from about 0.1 to about 30 wt. ppm of the circulating catalyst inventory on an elemental metal basis comprising a CO oxidation promoter selected from the group consisting of a platinum compound and a palladium compound; in a solvent comprising water or a hydrocarbon, said passage being made independently of said coke-contaminated catalyst and free of the reactor feedstock;

(b) passing to said regeneration zone said oxygen-containing regeneration gas in an amount stoichiometrically sufficient to convert at least a portion of the CO to $CO_2$;

(c) converting in said regeneration zone, at conversion conditions including the presence of said CO oxidation promoter and regenerated catalyst, at least a portion of the CO to $CO_2$ to produce said flue gas containing $CO_2$ and a CO concentration such that the $CO_2$ to CO is greater than about 1.5;

(d) measuring a regeneration zone temperature to determine a measured regeneration zone temperature and comparing said measured temperature with said predetermined temperature range; and (e) passing into said regeneration zone a second amount of said solution equivalent to from about 0.005 to about 10 wt. ppm of the circulating catalyst inventory on an elemental metal basis sufficient to maintain said measured regeneration zone temperature within said predetermined temperature range.

23. A method as described in claim 22 wherein said platinum compound is chloroplatinic acid.

24. A method as described in claim 22 wherein said first amount of solution passed into said regeneration zone in step (a) is that required to add promoter equivalent to from about 0.1 to about 15 wt. ppm. of the circulating catalyst inventory on an elemental metal basis.

25. A method as described in claim 22 wherein the amount of oxygen-containing regeneration gas is equivalent to about 10 to about 17 pounds of air per pound of coke entering the regeneration zone per unit time.

26. A method as described in claim 22 wherein said conversion conditions include a temperature of from about 1100° to about 1450° F. and a pressure of from about atmospheric to 50 psig.

27. A method as defined in claim 22 wherein said regeneration zone temperature is a dilute phase temperature.

28. A method as described in claim 22 wherein said palladium compound is chloropalladic acid.

29. In a process for regenerating a coke-contaminated catalyst which has become spent as a result of its use in a hydrocarbon cracking reactor wherein said coke-contaminated cracking catalyst and an oxygen-containing regeneration gas are passed to a regeneration zone maintained at oxidizing conditions which include a temperature within the range of from about 1100° to 1450° F and a pressure in the range of from about atmospheric to about 50 psig and coke is therein oxidized to produce regenerated catalyst and flue gas containing $CO_2$ and CO in a concentration such that the $CO_2$ to CO ratio is greater than about 1.5, a method of controlling a concentration of residual-carbon concentration range which method comprises the steps of:

(a) passing into said regeneration zone independently of said coke-contaminated catalyst and free of the reactor feedstock a first amount of a solution equivalent to from about 0.1 to about 30 wt. ppm of the circulating catalyst inventory on an elemental metal basis comprising a CO oxidation promoter selected from the group consisting of a platinum compound and a palladium compound in a solvent comprising water or a hydrocarbon;

(b) passing to said regeneration zone oxygen-containing regeneration gas in an amount stoichiometrically sufficient to convert at least a portion of the CO to $CO_2$;

(c) converting in said regeneration zone, at conversion conditions including the presence of said CO oxidation promoter and regenerated catalyst, at least a portion of the CO to $CO_2$ to produce flue gas containing $CO_2$ and CO;

(d) analyzing regenerated catalyst to determine a measured residual-carbon concentration and comparing said measured residual-carbon concentration with said predetermined residual carbon concentration range; and (e) passing into said regeneration zone said second amount of said solution equivalent to from about 0.005 to about 10 wt. ppm of the circulating catalyst inventory on an elemental metal basis sufficient to maintain said measured residual-carbon concentration within said predetermined residual carbon concentration range.

30. A method as described in claim 29 wherein said platinum compound is chloroplatinic acid.

31. A method as described in claim 29 wherein said first amount of solution passed into said regeneration zone in step (a) is that required to add promoter equivalent to from about 0.1 about 15 wt. ppm. of the circulating catalyst inventory on an elemental metal basis.

32. A method as described in claim 29 wherein the amount of oxygen-containing regeneration gas is equivalent to about 10 to about 17 pounds of air per pound of coke entering the regeneration zone per unit time.

33. A method as described in claim 29 wherein said conversion conditions include a temperature of from about 1100° to about 1450° F. and a pressure of from about atmospheric to 50 psig.

34. A method as described in claim 29 wherein said palladium compound is chloropalladic acid.

* * * * *